United States Patent
Mutescu et al.

(10) Patent No.: US 10,979,403 B1
(45) Date of Patent: Apr. 13, 2021

(54) CRYPTOGRAPHIC CONFIGURATION ENFORCEMENT

(71) Applicant: Amazon Technologies, Inc., Seattle, WA (US)

(72) Inventors: Dan Mutescu, Iasi (RO); Cristi Ursachi, Iasi (RO)

(73) Assignee: Amazon Technologies, Inc., Seattle, WA (US)

( * ) Notice: Subject to any disclaimer, the term of this patent is extended or adjusted under 35 U.S.C. 154(b) by 172 days.

(21) Appl. No.: 16/003,889

(22) Filed: Jun. 8, 2018

(51) Int. Cl.
*H04L 9/32* (2006.01)
*H04L 29/06* (2006.01)
*G06F 21/44* (2013.01)
*H04L 9/14* (2006.01)

(52) U.S. Cl.
CPC .......... *H04L 63/0428* (2013.01); *G06F 21/44* (2013.01); *H04L 9/14* (2013.01); *H04L 9/3242* (2013.01); *H04L 63/0884* (2013.01); *H04L 63/10* (2013.01); *H04L 63/12* (2013.01); *H04L 69/22* (2013.01)

(58) Field of Classification Search
CPC ..... H04L 63/0428; H04L 9/14; H04L 9/3242; H04L 63/0884; H04L 63/10; H04L 63/12; H04L 69/22; G06F 21/44
See application file for complete search history.

(56) References Cited

U.S. PATENT DOCUMENTS

| 6,915,433 | B1 | 7/2005 | Barber | |
|---|---|---|---|---|
| 7,827,408 | B1 * | 11/2010 | Gehringer | H04L 9/0631 713/170 |
| 8,028,329 | B2 * | 9/2011 | Whitcomb | H04L 63/0407 726/5 |
| 8,385,555 | B2 * | 2/2013 | Tang | H04L 9/14 380/278 |
| 8,416,709 | B1 | 4/2013 | Marshall et al. | |
| 8,601,263 | B1 | 12/2013 | Shankar et al. | |
| 8,782,403 | B1 | 7/2014 | Satish et al. | |

(Continued)

FOREIGN PATENT DOCUMENTS

| AU | 2012250524 A1 | 11/2013 |
|---|---|---|
| EP | 3005646 A1 | 4/2016 |

(Continued)

OTHER PUBLICATIONS

Kim, "A Cryptographically Enforced Access Control with a Flexible User Revocation on Untrusted Cloud Storage," pp. 149-160, Sep. 6, 2016. (Year: 2016).*

(Continued)

*Primary Examiner* — Luu T Pham
*Assistant Examiner* — James J Wilcox
(74) *Attorney, Agent, or Firm* — Davis Wright Tremaine LLP

(57) ABSTRACT

A system and method for providing data such as credentials to a third-party service while protecting the data from being transmitted to unintended locations. The system receives a first request containing encrypted data and information identifying the third-party service, validates that the first request is to be transmitted to the third-party service, generates a second request by replacing the encrypted data from the first request with unencrypted data, and transmits the second request to the third-party service.

20 Claims, 9 Drawing Sheets

(56) References Cited

U.S. PATENT DOCUMENTS

| | | | |
|---|---|---|---|
| 9,003,200 B1 | 4/2015 | Gardner | |
| 9,268,958 B1 | 2/2016 | Kessler | |
| 9,363,079 B2* | 6/2016 | Song | H04L 9/0869 |
| 9,367,697 B1* | 6/2016 | Roth | G06F 21/602 |
| 9,521,000 B1 | 12/2016 | Roth et al. | |
| 9,530,011 B2* | 12/2016 | French | H04L 9/3213 |
| 9,729,518 B1 | 8/2017 | Atsatt | |
| 10,110,611 B2* | 10/2018 | Dayka | G06F 21/602 |
| 2003/0046586 A1* | 3/2003 | Bheemarasetti | H04L 63/08 726/15 |
| 2005/0177724 A1* | 8/2005 | Ali | G06F 21/31 713/168 |
| 2005/0234828 A1* | 10/2005 | Matsuyama | H04L 9/321 705/51 |
| 2006/0123226 A1 | 6/2006 | Kumar et al. | |
| 2006/0242412 A1 | 10/2006 | Jung et al. | |
| 2007/0079117 A1 | 4/2007 | Bhogal et al. | |
| 2007/0130464 A1 | 6/2007 | Swedor et al. | |
| 2007/0203970 A1* | 8/2007 | Nguyen | H04L 63/0823 709/201 |
| 2007/0245416 A1 | 10/2007 | Dickinson et al. | |
| 2007/0276958 A1 | 11/2007 | Curtis et al. | |
| 2007/0294539 A1 | 12/2007 | Shulman et al. | |
| 2008/0084996 A1* | 4/2008 | Chen | H04L 9/0637 380/28 |
| 2008/0289019 A1* | 11/2008 | Lam | G06F 21/41 726/9 |
| 2009/0106550 A1 | 4/2009 | Mohamed | |
| 2009/0252323 A1 | 10/2009 | Cooper | |
| 2009/0300719 A1 | 12/2009 | Ferris | |
| 2010/0005483 A1 | 1/2010 | Rao | |
| 2010/0063988 A1 | 3/2010 | Khalid et al. | |
| 2010/0104101 A1 | 4/2010 | Dickinson et al. | |
| 2010/0205441 A1* | 8/2010 | Sandberg | H04L 9/0637 713/170 |
| 2010/0292556 A1 | 11/2010 | Golden | |
| 2011/0016156 A1 | 1/2011 | Golobay et al. | |
| 2011/0078285 A1* | 3/2011 | Hawkins | H04L 69/161 709/219 |
| 2011/0145573 A1* | 6/2011 | Nakai | H04L 63/16 713/160 |
| 2011/0161656 A1 | 6/2011 | Rao | |
| 2012/0045064 A1* | 2/2012 | Rembarz | H04L 67/06 380/281 |
| 2012/0084835 A1* | 4/2012 | Thomas | G06F 16/9535 726/3 |
| 2013/0046995 A1 | 2/2013 | Movshovitz | |
| 2013/0070925 A1 | 3/2013 | Yamada et al. | |
| 2013/0086379 A1 | 4/2013 | Shimizu | |
| 2013/0091351 A1 | 4/2013 | Manges | |
| 2013/0333009 A1* | 12/2013 | Mackler | H04L 9/3297 726/7 |
| 2014/0136834 A1* | 5/2014 | Sherkin | H04L 63/166 713/151 |
| 2014/0195798 A1 | 7/2014 | Brugger et al. | |
| 2014/0229737 A1 | 8/2014 | Roth et al. | |
| 2014/0373165 A1 | 12/2014 | Margolin | |
| 2015/0006908 A1* | 1/2015 | Mori | H04L 9/14 713/189 |
| 2015/0019858 A1 | 1/2015 | Roth et al. | |
| 2015/0074393 A1 | 3/2015 | Zhang | |
| 2015/0222603 A1 | 8/2015 | Uzun et al. | |
| 2015/0244517 A1* | 8/2015 | Nita | H04L 9/008 713/168 |
| 2015/0288512 A1* | 10/2015 | McGregor | H04L 9/0861 713/193 |
| 2015/0294117 A1 | 10/2015 | Cucinotta et al. | |
| 2015/0334095 A1* | 11/2015 | Thibaudeau | G06F 21/606 713/171 |
| 2016/0055770 A1 | 2/2016 | Li | |
| 2016/0072927 A1 | 3/2016 | Xue et al. | |
| 2016/0094723 A1* | 3/2016 | Jerath | H04M 15/8214 455/408 |
| 2016/0261418 A1 | 9/2016 | Keene et al. | |
| 2017/0034237 A1 | 2/2017 | Silver | |
| 2017/0048254 A1 | 2/2017 | Avi-Dan et al. | |
| 2017/0093916 A1 | 3/2017 | Arumugam et al. | |
| 2017/0126638 A1 | 5/2017 | Ye et al. | |
| 2017/0142191 A1* | 5/2017 | Caldwell | H04L 67/18 |
| 2017/0171200 A1* | 6/2017 | Bao | H04L 9/3247 |
| 2017/0201495 A1 | 7/2017 | Cooley | |
| 2018/0011867 A1 | 1/2018 | Bowman et al. | |
| 2018/0063275 A1 | 3/2018 | Kolhi et al. | |
| 2018/0130062 A1* | 5/2018 | O'Donnell | G06Q 20/40145 |
| 2018/0183802 A1* | 6/2018 | Choyi | H04L 63/102 |
| 2018/0199190 A1 | 7/2018 | Khan et al. | |
| 2018/0218446 A1* | 8/2018 | Ries | G06Q 40/02 |
| 2018/0234508 A1* | 8/2018 | Tsadok | H04L 67/02 |
| 2018/0247302 A1 | 8/2018 | Armstrong et al. | |
| 2019/0014094 A1 | 1/2019 | Le Saint | |
| 2019/0044940 A1 | 2/2019 | Khalil et al. | |
| 2019/0182250 A1* | 6/2019 | Kiester | H04L 63/0428 |
| 2019/0207914 A1* | 7/2019 | Gong | G06Q 20/32 |

FOREIGN PATENT DOCUMENTS

| | | |
|---|---|---|
| JP | H01161457 A | 6/1989 |
| JP | 200282609 A | 3/2002 |
| JP | 2002297606 A | 10/2002 |
| JP | 2004206573 A | 7/2004 |
| JP | 2005234759 A | 9/2005 |
| JP | 2005309846 A | 11/2005 |
| JP | 2009044320 A | 2/2009 |
| JP | 2015505994 A | 2/2015 |
| JP | 2015090993 A | 5/2015 |
| JP | 2015126320 A | 7/2015 |
| JP | 2016508699 A | 3/2016 |
| JP | 2016054430 A | 4/2016 |
| JP | 2016146618 A | 8/2016 |
| JP | 2016524429 A | 8/2016 |
| WO | 2008146332 A1 | 12/2008 |

OTHER PUBLICATIONS

Al-Husainy, "MAC Address as a Key for Data Encryption, International Journal of Computer Science and Information Security," Nov. 2013, pp. 1-6 (Year: 2013).*

Casu, C., et al., "Information Security Proxy Service," U.S. Appl. No. 15/927,954, filed Mar. 21, 2018.

Davis, M.E., et al., "Secure Data Ingestion for Sensitive Data Across Networks," U.S. Appl. No. 15/382,571, filed Dec. 16, 2016.

Davis, M.E., et al., "Secure Data Egress for Sensitive Data Across Networks," U.S. Appl. No. 15/382,577, filed Dec. 16, 2016.

Davis, M.E., et al., "Secure Data Distribution of Sensitive Data Across Content Delivery Networks," U.S. Appl. No. 15/382,579, filed Dec. 16, 2016.

Dworkin, M., "Recommendation for Block Cipher Modes of Operation: Galois/Counter Mode (GCM) and GMAC," NIST Special Publication 800-38D, Nov. 2007, 39 pages.

Indian First Examination Report dated Oct. 15, 2020, Patent Application No. 201917027338, 7 pages.

Japanese Non Final Notice of Rejection dated Sep. 29, 2020, Patent Application No. 2019-528633, 1 page.

Japanese Non Final Notice of Rejection dated Sep. 29, 2020, Patent Application No. 2019-531792, 2 pages.

Japanese Notice of Reasons for Rejection dated Oct. 6, 2020, Patent Application No. 2019-528630, 4 pages.

Santesson, S., "TLS Handshake Message for Supplemental Data," Request for Comments: 4680, Standards Track, Sep. 2006, 10 pages.

Santesson, S., et al., "TLS User Mapping Extension," Request for Comments: 4681, Standards Track, Oct. 2006, 11 pages.

Taylor, D., et al., "Using the Secure Remote Password (SRP) Protocol for TLS Authentication," Request for Comments: 5054, Informational, Nov. 2007, 25 pages.

Tuexen, M., et al., "Datagram Transport Layer Security (DTLS) for Stream Control Transmission Protocol (SCTP)," Request for Comments: 6083, Standards Track, Jan. 2011, 10 pages.

(56) References Cited

OTHER PUBLICATIONS

Turner, S., and T. Polk, "Prohibiting Secure Sockets Layer (SSL) Version 2.0," Request for Comments: 6176, Standards Track, Mar. 2011, 4 pages.
Atkinson, R., "IP Authentication Header," Request for Comments: 1826, Standards Track, Aug. 1995, 14 pages.
Atkinson, R., "IP Encapsulating Security Payload (ESP)," Request for Comments: 1827, Standards Track, Aug. 1995, 13 pages.
Atkinson, R., "Security Architecture for the Internet Protocol," Request for Comments: 1825, Standards Track, Aug. 1995, 23 pages.
Blake-Wilson, S., et al., "Elliptic Curve Cryptography (ECC) Cipher Suites for Transport Layer Security (TLS)," Request for Comments: 4492, Informational, May 2006, 36 pages.
Blake-Wilson, S., et al., "Transport Layer Security (TLS) Extensions," Request for Comments: 3546, Standards Track, Jun. 2003, 28 pages.
Blake-Wilson, S., et al., "Transport Layer Security (TLS) Extensions," Request for Comments: 4366, Standards Track, Apr. 2006, 29 pages.
Blumenthal, U., and P. Goel, "Pre-Shared Key (PSK) Ciphersuites with NULL Encryption for Transport Layer Security (TLS)," Request for Comments: 4785, Standards Track, Jan. 2007, 6 pages.
Brown, M., and R. Housley, "Transport Layer Security (TLS) Authorization Extensions," Request for Comments: 5878, Experimental, May 2010, 19 pages.
Chown, P., "Advanced Encryption Standard (AES) Ciphersuites for Transport Layer Security (TLS)," Request for Comments: 3268, Standards Track, Jun. 2002, 8 pages.
Dierks, T., and E. Rescorla, "The Transport Layer Security (TLS) Protocol Version 1.2," Request for Comments: 5246, Standards Track, Aug. 2008, 98 pages.
Dierks, T., et al., "The TLS Protocol Version 1.0," Request for Comments: 2246, Standards Track, Jan. 1999, 75 pages.
Eastlake, D., "Transport Layer Security (TLS) Extensions: Extension Definitions," Request for Comments: 6066, Standards Track, Jan. 2011, 25 pages.
Eronen, P., and H. Tschofenig, "Pre-Shared Key Ciphersuites for Transport Layer Security (TLS)," Request for Comments: 4279, Standards Track, Dec. 2005, 16 pages.
Ford-Hutchinson, P., "Securing FTP with TLS," Request for Comments: 4217, Standards Track, Oct. 2005, 29 pages.
Friend, R., "Transport Layer Security (TLS) Protocol Compression Using Lempel-Ziv-Stac (LZS)," Request for Comments: 3943, Informational, Nov. 2004, 13 pages.
Gutmann, P., "Encrypt-then-MAC for Transport Layer Security (TLS) and Datagram Transport Layer Security (DTLS)," Request for Comments: 7366, Standards Track, Sep. 2014, 7 pages.
Hoffman, P., "SMTP Service Extension for Secure SMTP over Transport Layer Security," Request for Comments: 3207, Standards Track, Feb. 2002, 9 pages.
Hollenbeck, S., "Transport Layer Security Protocol Compression Methods," Request for Comments: 3749, Standards Track, May 2004, 8 pages.
Housley, R., "Using Advanced Encryption Standard (AES) CCM Mode With IPsec Encapsulating Security Payload (ESP)," Request for Comments: 4309, Standards Track, Dec. 2005, 14 pages.
International Search Report and Written Opinion dated Apr. 5, 2018, International Patent Application No. PCT/US2017/066170, dated Dec. 13, 2017, 13 pages.
International Search Report and Written Opinion dated Apr. 6, 2018, International Patent Application No. PCT/US2017/066165, filed Dec. 13, 2017, 16 pages.
International Search Report and Written Opinion dated Mar. 7, 2018, International Patent Application No. PCT/US2017/066171, filed Dec. 13, 2017, 17 pages.
Kanno, S., and M. Kanda, "Addition of the Camellia Cipher Suites to Transport Layer Security (TLS)," Request for Comments: 6367, Informational, Sep. 2011, 9 pages.

Karn, P., et al., "The ESP DES-CBC Transform," Request for Comments: 1829, Standards Track, Aug. 1995, 11 pages.
Kato, A., et al., "Camellia Cipher Suites for TLS," Request for Comments: 5932, Standards Track, Jun. 2010, 7 pages.
Kent, S., "IP Encapsulating Security Payload (ESP)," Request for Comments: 4303, Standards Track, Dec. 2005, 45 pages.
Kent, S., and K. Seo, "Security Architecture for the Internet Protocol," Request for Comments: 4301, Standards Track, Dec. 2005, 102 pages.
Kent, S., and R. Atkinson, "Security Architecture for the Internet Protocol," Request for Comments: 2401, Standards Track, Nov. 1998, 62 pages.
Khare, R., et al., "Upgrading to TLS Within HTTP/1.1," Request for Comments: 2817, Standards Track, May 2000, 13 pages.
Kim, W., et al., "Addition of the ARIA Cipher Suites to Transport Layer Security (TLS)," Request for Comments: 6209, Informational, Apr. 2011, 10 pages.
Lee, H.J., et al., "Addition of SEED Cipher Suites to Transport Layer Security (TLS)," Request for Comments: 4162, Standards Track, Aug. 2005, 7 pages.
Mavrogiannopoulos, N., "Using OpenPGP Keys for Transport Layer Security (TLS) Authentication," Request for Comments: 5081, Experimental, Nov. 2007, 9 pages.
Mavrogiannopoulos, N., and D. Gillmor, "Using OpenPGP Keys for Transport Layer Security (TLS) Authentication," Request for Comments: 6091, Informational, Feb. 2011, 9 pages.
Mcgrew, D., and D. Bailey, "AES-CCM Cipher Suites for Transport Layer Security (TLS)," Request for Comments: 6655, Standards Track, Jul. 2012, 8 pages.
Mcgrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.
Medvinsky, A., et al., "Addition of Kerberos Cipher Suites to Transport Layer Security (TLS)," Request for Comments: 2712, Standards Track, Oct. 1999, 7 pages.
Merkle, J., and M. Lochter, "Elliptic Curve Cryptography (ECC) Brainpool Curves for Transport Layer Security (TLS)," Request for Comments: 7027, Informational, Oct. 2013, 11 pages.
Metzger, P., et al., "IP Authentication Using Keyed MD5," Request for Comments: 1828, Standards Track, Aug. 1995, 6 pages.
Moriai, S., et al., "Addition of Camellia Cipher Suites to Transport Layer Security (TLS)," Request for Comments: 4132, Standards Track, Jul. 2005, 8 pages.
Newman, C., "Using TLS with IMAP, POP3 and ACAP," Request for Comments: 2595, Standards Track, Jun. 1999, 16 pages.
Orman, H., "The OAKLEY Key Determination Protocol," Request for Comments: 2412, Informational, Nov. 1998, 56 pages.
Phelan, T., "Datagram Transport Layer Security (DTLS) over the Datagram Congestion Control Protocol (DCCP)," Request for Comments: 5238, Standards Track, May 2008, 11 pages.
Rescorla, E., "HTTP Over TLS," Request for Comments: 2818, Informational, May 2000, 8 pages.
Rescorla, E., "TLS Elliptic Curve Cipher Suites with SHA-256/384 and AES Galois Counter Mode (GCM)," Request for Comments: 5289, Informational, Aug. 2008, 7 pages.
Rescorla, E., and N. Modadugu, "Datagram Transport Layer Security Version 1.2," Request for Comments: 6347, Standards Track, Jan. 2012, 33 pages.
Rescorla, E., and N. Modadugu, "Datagram Transport Layer Security," Request for Comments: 4347, Standards Track, Apr. 2006, 26 pages.
Rescorla, E., et al., "Transport Layer Security (TLS) Renegotiation Indication Extension," Request for Comments: 5746, Standards Track, Feb. 2010, 16 pages.
Salowey, J., et al., "AES Galois Counter Mode (GCM) Cipher Suites for TLS," Request for Comments: 5288, Standards Track, Aug. 2008, 9 pages.
Salowey, J., et al., "Transport Layer Security (TLS) Session Resumption without Server-Side State," Request for Comments: 5077, Standards Track, Jan. 2008, 21 pages.

(56) References Cited

OTHER PUBLICATIONS

Salter, M., and R. Housley, "Suite B Profile for Transport Layer Security (TLS)," Request for Comments: 6460, Informational, Jan. 2012, 15 pages.
Indian First Examination Report dated Dec. 4, 2020, Patent Application No. 201917027339, 6 pages.
Indian First Examination Report dated Nov. 13, 2020, Patent Application No. 201917027337, 6 pages.
European Communication pursuant to Article 94(3) EPC dated Nov. 18, 2020, Patent Application No. 17823321.9, 6 pages.
Japanese Decision for Grant dated Jan. 26, 2021, Patent Application No. 2019-531792, 1 page.

* cited by examiner

CRYPTOGRAPHIC CONFIGURATION ENFORCEMENT

BACKGROUND

The providers of integrating services (for example, cloud computing service providers) routinely exchange sensitive information with third-party services. In some cases, the third-party services allow integrating services to authenticate with their services using an open access delegation standard, such as OAuth. Under this model, customers first enter their credentials on a sign-in page hosted by the third-party service, which, upon successful validation, causes a limited access token to be vended to the integrating service for use with the third-party service's application programming interfaces (APIs).

Some third party services use username and password based authentication called "basic authentication." Under the basic authentication model, the customer's username and password must be provided in each request made to the third party's API in order to authenticate with their service. However, secure handling plaintext username and passwords of any third-party service within the integrating service involves the use of significant effort and resources to prevent security breaches that can potentially result in exposure of credentials to unauthorized parties.

To avoid exposure of user credentials resulting from security breaches, user data are typically encrypted by a user device before they are transferred over to an integrating service and to a third-party service provider. In many cases, the encryption approach can prove effective as the user credentials can only be decrypted by an entity having a private key. However, encryption mechanisms cannot determine whether the integrating service correctly transmits the encrypted data to the intended destination.

BRIEF DESCRIPTION OF THE DRAWINGS

Various techniques will be described with reference to the drawings, in which.

DETAILED DESCRIPTION

Figure 1:
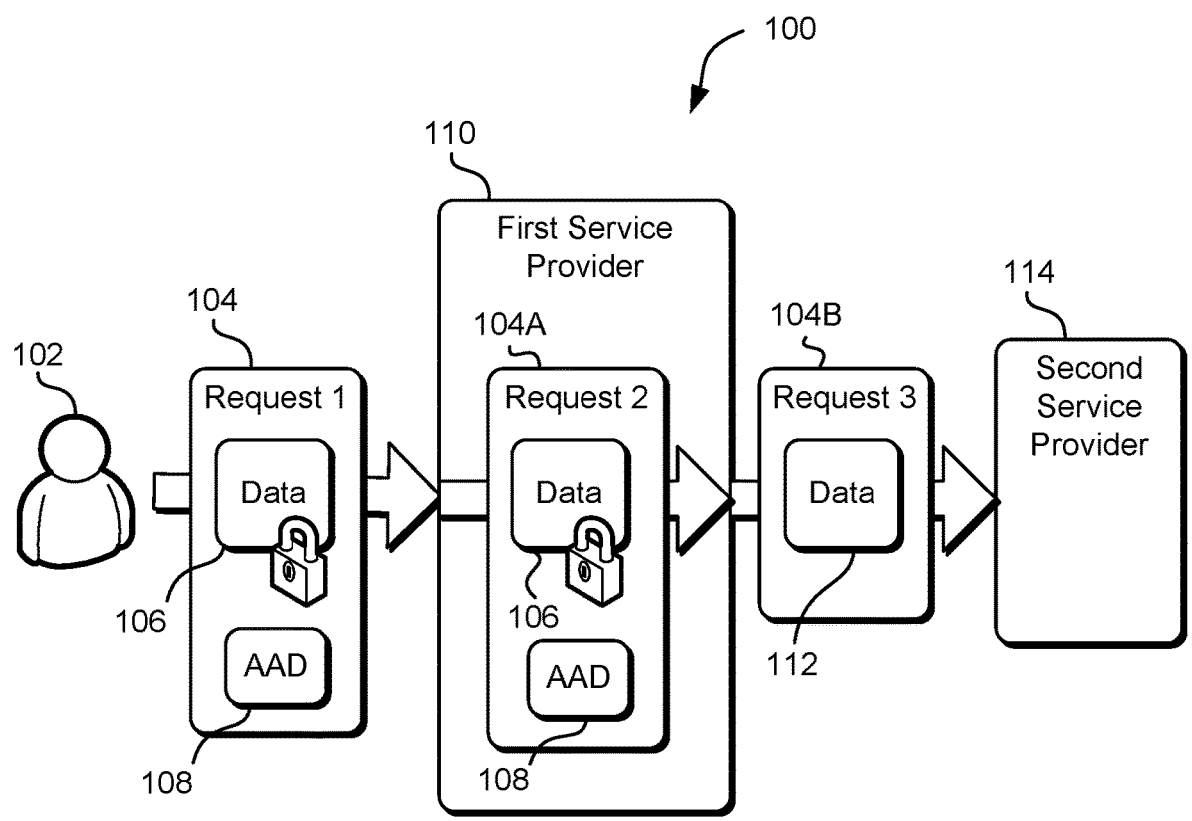
FIG. 1 illustrates an example diagram of a system in which a first service provider integrates with a second service provider in accordance with an embodiment.

Techniques described and suggested herein include systems, methods, and processes for an information security proxy service which intercepts requests initiated within a private network, decrypts sensitive data (e.g., encrypted credentials), validates whether the sensitive data will be provided to the correct destination, and, if so, passes such sensitive data on to a third-party service. The information security proxy service may also be called an "information security service" or ISS. The sensitive data is encrypted by a client (such as an application running on a user device) using a symmetric cryptographic key ("symmetric key") generated by the client, and the symmetric key is in turn encrypted by a public key issued by the ISS. In addition, any information usable to identify the external, third-party service is added into additional authentication data ("AAD") which is submitted with the symmetric key to encrypt the sensitive data. The encrypted data, the AAD, and the symmetric key (which is itself encrypted via a public key provided by a third-party service) are then passed via message to integrating services within the private network, which determine if the message should be routed to the ISS. The integrating services then route the message to the ISS without decrypting the sensitive data.

When the ISS receives the message from the integrating services, the ISS determines whether the destination information included in the AAD matches the destination information indicated by the header of the message. If both data match, the ISS uses its cryptographic key to decrypt the encrypted symmetric key, then uses the decrypted symmetric key to decrypt the encrypted data. In some implementations, the ISS also performs cryptographic validation of the AAD in addition to the decryption of encrypted data. The ISS finally places the decrypted sensitive data in a new message (request), and forwards the new request to a third-party service.

In one example, a user will enter credentials in an application hosted on a user device, such as a personal assistant device. The credentials are to access a third-party service to be used in subsequent requests to the third-party service to attempt to access a resource of the third-party service. For example, the third-party service may be an online shopping service and the credentials may be a username and password for accessing the online shopping service. When the user makes a request through the personal assistant application to purchase an item on the online shopping service, the personal assistant application first encrypts the credentials using a symmetric key and the AAD (which identifies third-party service). The symmetric key is in turn encrypted by a public key of the ISS. The cryptographic binding of AAD to the encrypted credentials ensure that any information in the AAD cannot be changed or separated (without causing an invalid message authentication code (MAC) during decryption) except by an entity having the private key and enabled to decrypt the encrypted credentials. The encrypted credentials (or sometimes referred to as "encrypted payload"), the encrypted symmetric key, and the AAD are then added to the request and the request is sent to an integrating service hosted in a private network.

The integrating service determines whether the request should be routed directly to the third-party service (the online shopping service), or if it should be routed to the ISS (if it determines the request contains encrypted data). If the request contains encrypted data, it is routed by the integrating service to the ISS. Alternatively, if the request contains the AAD with all valid data fields, the request can be routed to the ISS. The ISS accepts the request and verifies whether the destination information in the AAD matches the destination information in the header of the request. If verified, the ISS uses its private key to decrypt the symmetric key, decrypts the sensitive data (the credentials) through the symmetric key. If the decryption is successful, the ISS sends a new request with the decrypted credentials (for example, plaintext credentials) to the third-party service. Conversely, if the AAD does not match the destination header and subsequent authentication fails, the ISS denies the request from being further processed. Finally, the ISS receives the result returned by the third-party service and routes it to the integrating service, which in turn routes the result back to the application on the user device. In an embodiment, the result may also be encrypted by the ISS before it is returned to the integrating service.

As one skilled in the art will appreciate in light of this disclosure, certain embodiments may be capable of achieving certain advantages, including improving the security of a system by reducing the opportunity for unauthorized exposure of user credentials and/or other sensitive data to intermediate services. Moreover, verifying destination information through AAD ensures that the encrypted credentials are decrypted and transmitted to the correct third-party service. In this manner, improvement to the secure transfer of sensitive data can be achieved. The use of AAD ensures that no party can maliciously or unintentionally switch information in the request with other information.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details.

FIG. 1 illustrates an example diagram of a system 100 in which a first service provider 110 integrates with a second service provider 114 in accordance with an embodiment. A user 102 provides encrypted data 106 and AAD 108 as part of a first request (Request 1) 104 to access one or more resources of a second service provider 114. In one embodiment, the encrypted data 106 may be user credentials (e.g., a username, password, etc.) needed for an account hosted by the second service provider 114. In some embodiments, AAD 108 may include any information indicative of the identity of second service provider 114. In several embodiments, information in the AAD 108 may include domain name of the second service provider 114, any other regular expression ("regexp") indicating the identity of the second service provider 114, description of the second service provider 114, or information identifying the user 102. In one embodiment, AAD 108 may also include expiration timestamp or time range which the first service provider 110 will not route the request 104 if it is expired. In an embodiment, AAD is data input into an authenticated encryption mode of a cipher and used in the generation of a MAC or other integrity data. In some implementations, AAD is not part of the data that becomes encrypted, yet still contributes to the data over which the integrity data of the cipher is computed. In other words, in an authenticated encryption mode of a cipher, the cipher may protect two types of data, plaintext and AAD. The cipher may protect the confidentiality and authenticity of the plaintext while only protecting the authenticity of the AAD. Example use of AAD is described in the National Institute of Standards and Technology (NIST) Special Publication 800-38D, published in November 2007, which describes Recommendations for the Galois/Counter Mode (GCM) for block ciphers such as the Advanced Encryption Standard (AES). Note however, that the scope of the present disclosure is not limited to AES-GCM, but extends to other ciphers that utilize AAD. In addition, the scope of the present disclosures also extends to ciphers utilizing any plaintext data that is enabled to be cryptographically bound to the encrypted data through the use of a symmetric key and/or an asymmetric key and integrity information, such as a MAC.

The first request 104 containing encrypted data 106 and AAD 108 are received at a first service provider 110. The first service provider 110 may alter the first request 104 to create a second request (Request 2) 104A as may be appropriate for internal processing (as will be explained in additional detail in FIG. 2). The first service provider 110 then determines if the information in the AAD 108 matches the destination (or also referred to as "endpoint") information provided in the request 104A. In one embodiment, the destination information provided in the request 104A is located in the header portion of the request 104A, such as information provided in the destination port of the request 104A. In other implementations, the destination information provided in the request 104A may be provided as a separate variable within the body of the request. If both data match, the first service provider 110 then decrypts the encrypted data 106 to create decrypted data 112, and forwards the decrypted data 112 as part of a third request (Request 3) 104B to the second service provider 114. In an embodiment, the second service provider 114 may be a third-party service such as an online shopping service, cloud calendar service, or a financial service, or any other appropriate type of third-party service.

In an embodiment, the user 102 provides the encrypted data 106 through a computing device and application running on the device that is configured to communicate with the first service provider 110, such as through an application programming interface (API) of the first service provider 110. The application programming interface, for instance, may be a web service interface. The first service provider 110 may be a computer system (e.g., a distributed computer system) configured with hardware and software to provide an interface to users (through user devices) and to perform other operations as described herein for the purpose of performing services. The user credentials, as discussed above, may be a username and password pair, but other types of sensitive data are considered as being within the scope of the present disclosure. Examples are other types of credentials which may include, but are not limited to, symmetric and asymmetric cryptographic keys, one-time password codes, access codes, biometric data, secret codes, shared secrets, personal identifiable information (PII), and/or other information that is classified as sensitive. Examples of PII include, but are not limited to, social security numbers, age, military rank, civilian grade, marital status, race, salary, home phone numbers, other demographic, biometric, personnel, medical, and financial information, or any other information about an individual that identifies, links, relates, or is unique to that individual.

In an embodiment, the first service provider 110 may be an integrating service, a web services provider, a cloud computing platform, an infrastructure-as-a-service (IaaS) platform, or any other appropriate network-based service provider. The first service provider 110 may host an intermediate service, such as a personal assistant voice service, a calendar service, a shopping service, an email or messaging service, a navigation service, or any other appropriate service hosted on a private network. The first service provider 110 may also host an information security service which is responsible for decrypting the encrypted data 106 to create decrypted data 112. Additional detail on the intermediate service and information security service is provided in FIG. 2. The first service provider 110 sends the decrypted data (e.g., decrypted user credentials) to the second service provider 114. The second service provider 114 may be a third-party calendar service, a shopping web site, an email provider, a ride sharing service, or any other appropriate service provider that is separate from and not managed by the first service provider 110.

Figure 2:
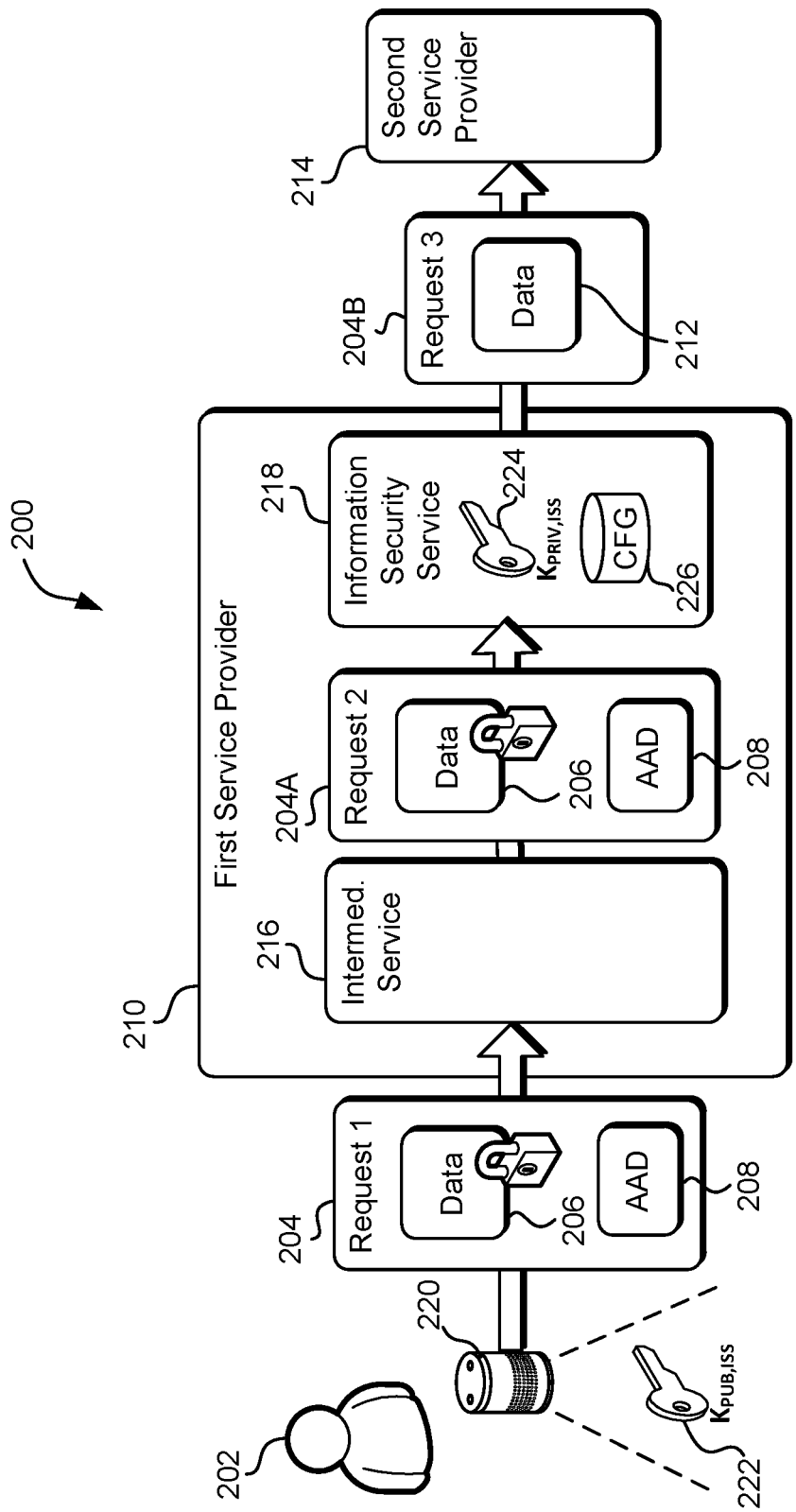
FIG. 2 illustrates an example diagram of an information security proxy service in accordance with an embodiment.

FIG. 2 illustrates an example diagram of a system 200 comprising an information security service in accordance with an embodiment. In an embodiment, a first service provider 210 includes an intermediate service 216 and an information security service (ISS) 218. The first service provider 210 may be the first service provider 110 discussed above in connection with FIG. 1. In an example, the intermediate service 216 is a suite of utilities, applications, components, and/or services hosted on a network or cloud computing service (such as a private network). As previously described in reference to FIG. 1, an intermediate service may be a personal assistant voice service, a calendar service, a shopping service, an email or messaging service, a navigation service, or any other appropriate service hosted on a private network.

In an example, the ISS 218 is a proxy service hosted by the first service provider 210. The intermediate service 216 intercepts a first request (Request 1) 204 and modifies the first request 204 to create a second request (Request 2) 204A. In an embodiment, second request 204A and first request 204 may be identical. In another embodiment, second request 204A may be the result of processing first request 204. This processing may include, but is not limited to, adding a destination to the request, adding information to the request, formatting information contained in the request, or any other appropriate type of processing. In an embodiment, the first request 204 may not contain encrypted data 206, and intermediate service 216 may instead fetch the encrypted data 206 from secure storage (not shown). In another embodiment, first request 204 may contain instructions that allow intermediate service 216 to create the request intended for the second service provider 214, including fetching the encrypted data 206 from secure storage. In this embodiment, first request 204 may be a voice command from user device 220, such as a request to add an event to an external calendar provided by second service provider 214, and, in response, intermediate service 216 may construct the actual request to be sent to second service provider 214 (second request 204A). In some embodiments, intermediate service 216 generates the request 204A as a result of validating that AAD 208 is provided with the request 204. In other embodiments, intermediate service 216 generates the request 204A as a result of determining that the AAD 208 includes the required data fields. The ISS 218 intercepts the second request 204A transmitted to the second service provider 214 (e.g., a third-party service) containing encrypted data 206, decrypts the data. In addition to decrypting the data, the ISS 218 determines whether destination information of the request 204A matches the destination information provided in the AAD 208. In some implementations, destination information is compared with AAD 208 before the decryption occurs, so that the decryption will only be performed if the destination data matches the AAD 208. In other implementations, the destination information is compared with AAD 208 after the decryption occurs, so that the comparison is performed only when the decryption is successful. In yet other implementations, destination information is compared with AAD 208 independent of the decryption, and the ISS 218 issues an error if either the destination check or decryption fails. In any of the above implementations, the ISS 218 may cryptographically validate the AAD 208 by authenticating the MAC of the encrypted data 206. The ISS 218 then routes the decrypted data 212 to the second service provider 214 in a new request (Request 3) 204B. Conversely, if the destination information of the request 204A does not match the information in the AAD, or if decryption of encrypted data 206 fails (e.g., the MAC cannot be authenticated), the ISS 218 deletes the request 204A or classifies the destination information of the request 204A as an unauthorized domain/address. In this example, request 204 may be request 104 discussed above in connection with FIG. 1, request 204A may be request 104A of FIG. 1, request 204B may be request 104B of FIG. 1, encrypted data 206 may be encrypted data 106 of FIG. 1, AAD 108 may be AAD 208, decrypted data 212 may be decrypted data 112 of FIG. 1, and second service provider 214 may be second service provider 114 of FIG. 1.

In an example use case, a user 202 enters user credentials (sensitive data 206) associated with a cloud-based calendar account provided by the second service provider 214 into a user device 220. User 202 may be user 102 discussed above in connection with FIG. 1. User device 220 may be a mobile phone, personal digital assistant, computer, laptop, tablet, or any other appropriate electronic user device. User device 220 generates a symmetric key (not shown) and determines the AAD 208 which includes the domain of second service provider 214. User device 220 encrypts the sensitive data 206 using the symmetric key, and the AAD 208. In some implementations, the encrypted data 206 includes the encrypted bits of the sensitive data 206 and a MAC. User device 220 then embeds or attaches encrypted data 206, the symmetric key, and AAD 208 into request 204 and transmits a first request 204 to first service provider 210. In some implementations, the symmetric key may be encrypted with a public cryptographic key issued by the second service provider 214.

The first request 204 (as well as requests 204A and 204B) may be any appropriate type of request, including, but not limited to, a SOAP, XML, or WSDL request, and may be transmitted over any appropriate transport protocol, including, but not limited to, HTTP, TCP/IP, FTP, or SMTP. Any other request type or transport protocol is considered within the spirit of the present disclosure.

Continuing the example of the cloud-based calendar account, intermediate service 216 may be an internal calendar service provided by first service provider 210, where the internal calendar service is specifically integrated with user device 220, which may be a personal assistant device. User 202 may prefer working with an external, third-party calendar service (external calendar service), which, in this example, is second service provider 214 of FIG. 2. In the example use case, user 202 may make a voice command to user device 220, requesting that a new event be added to the user's calendar. User device 220 generates request 204, which contains the "add event" request and supporting information (e.g., date/time/event title), as well as user credentials (e.g., username and password) and domain name of the external calendar service. User device 220 encrypts at least the user credentials (encrypted data 206) by using a symmetric key, which is in turn encrypted by a public cryptographic key associated with information security service 218. The user device also determines AAD 208 which includes the domain name of the second service provider 214. In several embodiments, the user device 220 encrypts the user credentials by using the AAD 208 with the symmetric key, which as a result cryptographically binds the AAD 208 to the encrypted data 206. User device 220 then transmits request 204 to intermediate service 216 (the internal calendar service).

Intermediate calendar service 216 receives request 204 and determines if the request 204 should be routed directly to the second service provider 214 (the external calendar service) or if it should be first routed to ISS 218. This determination may be made by the intermediate service 216 consulting a look-up table specifying request types and associated destinations, by inspection of the request 204, by the intermediate service 216 detecting the presence of encrypted data, by default (i.e., all requests may automatically be routed to the ISS 218), or by any other appropriate method. In one embodiment, the intermediate service 216 also verifies whether AAD 208 is present within the request 204. In the calendar use case, the intermediate calendar service 216 determines that request 204 contains encrypted data 206 which must be decrypted by ISS 218 and the AAD 208. Intermediate calendar service 216 generates second request 204A, which may be identical to first request 204 or may be modified as described above. Intermediate calendar service 216 routes second request 204A to ISS 218. It should be noted that intermediate service 216 cannot see encrypted data 206, as it has been encrypted with a cryptographic key 222 associated with and the ISS 218. As further described below, however, the intermediate service 216 may determine whether the AAD included in the request is valid, including a determination whether the AAD 208 includes all the required data fields to be processed by the ISS 218. If invalid, the intermediate service 216 may deny the request from being transmitted to the third-party service provider or the ISS 218.

The ISS 218 receives second request 204A and uses private cryptographic key 224 to decrypt the encrypted data (such as credentials) 206 to create decrypted data (credentials) 212. In an example, ISS 218 may access configuration information from configuration datastore 226 to determine which portions or fields of encrypted data 206 to decrypt, and generate new request (Request 3) 204B containing decrypted data (credentials) 212. The configuration information may include, but not be limited to, a description of header types associated with sensitive information. The ISS 218 then transmits the decrypted data (credentials) 212 to the second service provider 214, the external calendar service, in a new request 204B.

In an embodiment, the ISS 218 may not use configuration information to determine which portions of request 204A to decrypt, and may instead rely on detection of a specific keyword within request 204A. That is, instructions embedded within ISS 218 may cause the ISS 218 to detect and replace the keyword and/or any sensitive or encrypted data associated with the keyword, without the need for additional, external configuration data.

In an embodiment, user device 220 may use network-based security services to perform the encryption and decryption of user credentials or other sensitive data, rather than using client-side encryption processes. Some cloud computing service providers offer network-based services for the secure ingress of sensitive data (sensitive data entering the cloud computing service network) and secure egress of sensitive data (sensitive data leaving the cloud computing service network). Instead of encrypting the sensitive data itself, user device 220 may call, for example, a secure ingress service of the cloud computing service platform, which would accept the sensitive data, encrypt it, and store it separately from the intermediate service 216. In this embodiment, the encrypted data 206 may not be sent as part of first request 204, but may be retrieved by the ISS 218 from an approved datastore used by the secure ingress system upon receipt of request 204 and embedded in second request 204A. A similar approach may be used for sensitive data leaving the cloud computing service platform, using a secure egress function. Examples of such secure ingress and secure egress are described in U.S. patent application Ser. No. 15/382,571, filed on Dec. 16, 2016, entitled "SECURE DATA INGESTION FOR SENSITIVE DATA ACROSS NETWORKS," U.S. patent application Ser. No. 15/382,577, filed on Dec. 16, 2016, entitled "SECURE DATA EGRESS FOR SENSITIVE DATA ACROSS NETWORKS," and U.S. patent application Ser. No. 15/382,579, filed on Dec. 16, 2016, entitled "SECURE DATA DISTRIBUTION OF SENSITIVE DATA ACROSS CONTENT DELIVERY NETWORKS," the disclosures of which are incorporated herein by reference for all purposes.

In one embodiment, the ISS 218 may determine whether to decrypt the encrypted data 206 by verifying whether the destination information indicated in the header of request 204A matches the AAD 208. In this embodiment, the ISS 218 extracts the destination information from the header of the request 204A and generates a search query to be performed on the AAD 208. If the search on the AAD 208 is found, the ISS 218 proceeds with decrypting the encrypted data (such as credentials) 206 to create decrypted data (credentials) 212. During decryption, the ISS 218 first decrypts the symmetric key with its private cryptographic key, and the symmetric key is used to decrypt encrypted data 206. In some implementations, the MAC of the encrypted data 206 is used to authenticate whether the encrypted data 206 and/or the AAD 208 have not been altered, compromised, or tampered during its transmission from the user device 220 to the ISS 218. Once the decryption is successful, the ISS 218 then transmits the decrypted data (credentials) 212 to the second service provider 214, the external calendar service, in a new request 204B.

In an alternate example use case, user 202 may use a mobile phone (user device 220) to access a music service through first service provider 210. That is, the intermediate service 216 may be an application providing a user interface to a third-party music service. User 202 opens the music service application on the user device 220 and searches for songs by a particular artist. The music service application hosted on the mobile phone 220 formulates a request 204 for the intermediate service 216. If this is the first time the user 202 has used this music service, the music service application may prompt the user 202 to enter the user credentials of an account associated with the music service. Once the user credentials are obtained, the music service application may obtain a symmetric key, determine the AAD 208 which includes the music service domain in regexp format, encrypt the use credentials using the symmetric key and the AAD 208, and embed both in the request 204, or may use a secure ingress service such as that described in U.S. patent application Ser. No. 15/382,571, filed on Dec. 16, 2016, entitled "SECURE DATA INGESTION FOR SENSITIVE DATA ACROSS NETWORKS" to encrypt and store the credentials and the corresponding AAD in secure storage for later retrieval by the intermediate service.

The user device 220 then transmits the completed request 204 with the encrypted user credentials (encrypted data) 206 (or a link to the encrypted data 206 as stored in secure storage) and the AAD 208 to the intermediate service 216. Intermediate service 216 processes request 204 by determining if it can be routed directly to the music service (the second service provider 214), or if it must generate second request 204A to pass through the ISS 218 so that the encrypted credentials may be decrypted for use with the music service (second service provider) 214. In determining that the request 204 needs to be routed to ISS 218, the intermediate service fetches the encrypted credentials from secure storage, if required, to complete second request 204A before routing it to the ISS 218.

As previously described, the intermediate service 216 may need to fetch the encrypted credentials from secure storage and embed them in second request 204A before forwarding it on to ISS 218. Other minor changes may be made to first request 204 to generate second request 204A which are within the spirit of the present disclosure. Although first request 204 is shown in FIG. 2 as being modified to create second request 204A, in an embodiment, intermediate service 216 may alternately pass first request 204 directly to the ISS 218 without modification.

The ISS 218 receives second request 204A and determines whether the destination information in the second request 204A matches the information in the embedded AAD 208. If they match, the ISS 218 then decrypts the credentials to create a set of decrypted data (user credentials) 212, which can be used directly to access the music service (second service provider) 214. In other implementations, the ISS 218 uses MAC authentication of the encrypted data 206 before comparing the destination information so as to authenticate the AAD 208. These decrypted data (user credentials) 212 are transmitted in a third request (Request 3) 204B to the music service (second service provider) 214, which uses the decrypted data (user credentials) 212 to allow access to the account of the user 202, fulfilling the request made to the music service (second service provider) 214.

Figure 3:
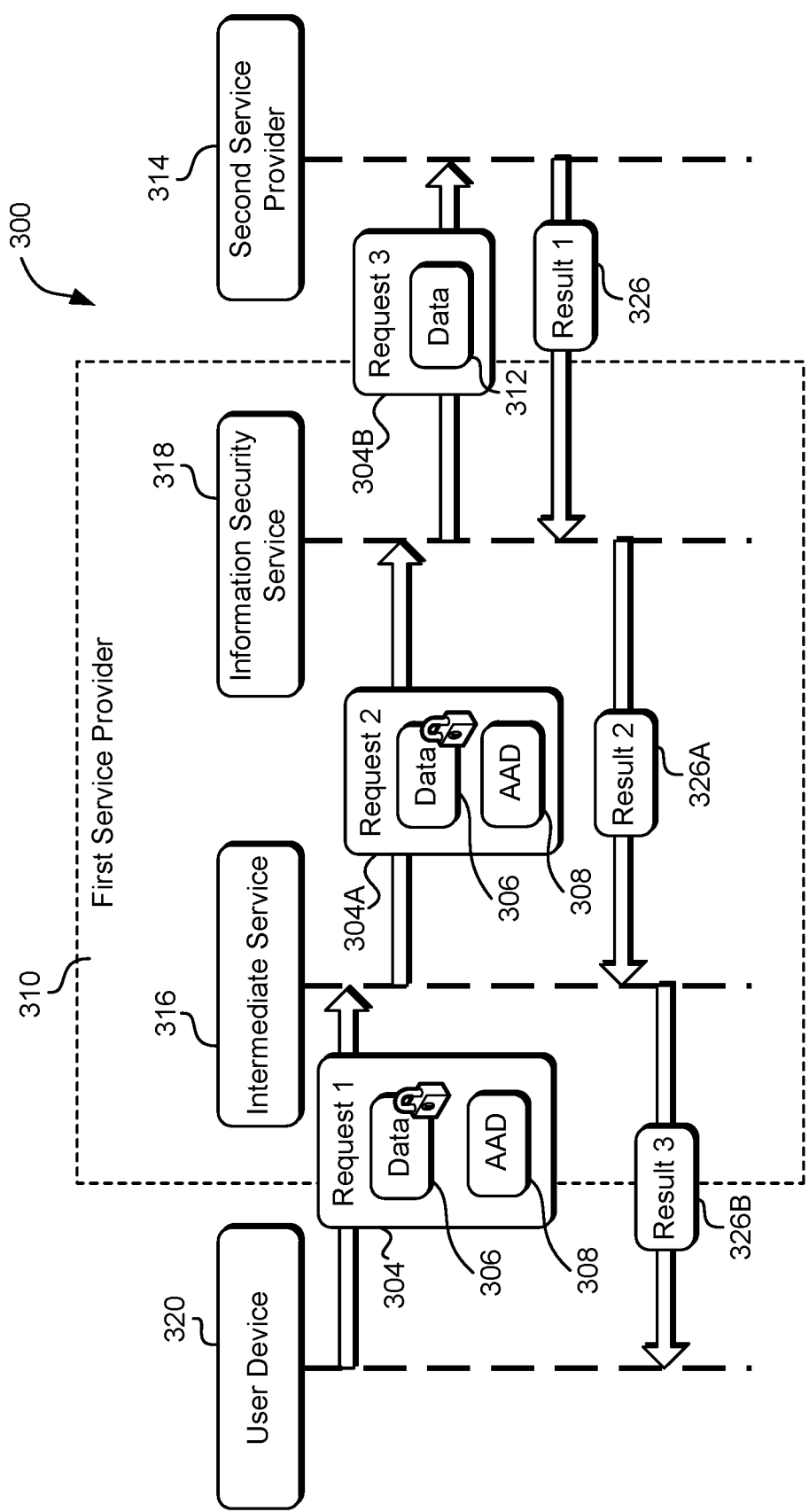
FIG. 3 illustrates an example sequence diagram for an information security proxy service in accordance with an embodiment.

FIG. 3 illustrates an example sequence diagram 300 for the information security service of FIG. 2 in accordance with an embodiment. User device 320 generates a first request (Request 1) 304 to access a resource of second service provider 314. Request 304 contains encrypted data 306, which in, in an example, may be encrypted credentials associated with an account hosted by second service provider 314. Request 304 further contains AAD 308, which may include any information used to identify the second service provider 314. User device 320 transmits request 304 to an intermediate service 316 (hosted by a first service provider 310), wherein the intermediate service 316 is responsible for processing request 304. Intermediate service 316 determines whether request 304 should be routed directly to second service provider 314 or if a third request (Request 3) 304B needs to be created and forwarded to the ISS 318. As described herein, intermediate service 316 may make this determination by consulting a datastore (not shown) associating requests 304 with one or more third-party services, or it may simply route all requests 304 to ISS 318. In some embodiments, intermediate service 316 may determine whether AAD 308 includes information of the second service provider 314. As previously described, in an example embodiment, second request 304A may be identical to first request 304, or may be modified as previously described herein. It should be noted that intermediate service 316 does not have access to encrypted data 306 but simply routes the data as part of the request 304A to the appropriate end point.

ISS 318 receives the routed second request 304A and determines whether destination information contained in header of request 304A matches the destination information in AAD 308. If so, the ISS 318 decrypts the encrypted data 306 to obtain decrypted data 312. ISS 318 then creates third request 304B and places decrypted data 312 inside the request 304B. Second service provider 314 receives request 304B and uses decrypted data 312 to process the request 304B. Second service provider 314 then obtains a first result 326 from processing request 304B and returns result 326 to ISS 318. ISS 318 may modify first result 326 to create a second result 326A, and forwards the result 326A to the intermediate service 316, which in turn generates result 326B, based at least in part on result 326A, and routes the result 326B back to the user device 320. It should be noted that, in an embodiment, result 326B may be identical to result 326A, and/or result 326A may be identical to result 326. Differences between results 326, 326A, and 326B may include, but are not limited to adding a destination to the result, adding information to the result, formatting information contained in the result, performing a cryptographic operation on the result, or any other appropriate type of processing.

It should be noted that intermediate service 316 may be intermediate service 216 discussed above in connection with FIG. 2, user device 320 may be user device 220 of FIG. 2, request 304 may be request 204 of FIG. 2, request 304A may be request 204A of FIG. 2, request 304B may be request 204B of FIG. 2, encrypted data 306 may be encrypted data 206 of FIG. 2, AAD 308 may be AAD 208 of FIG. 2, decrypted data 312 may be encrypted data 212 of FIG. 2, and second service provider 314 may be second service provider 214 of FIG. 2.

It should be appreciated that alternate embodiments may have numerous variations from that described above. For example, in an embodiment, ISS 318 may encrypt the result 326 received from second service provider 314 before routing the encrypted result to the intermediate service 316. Numerous other variations are within the spirit of the present disclosure.

Figure 4:
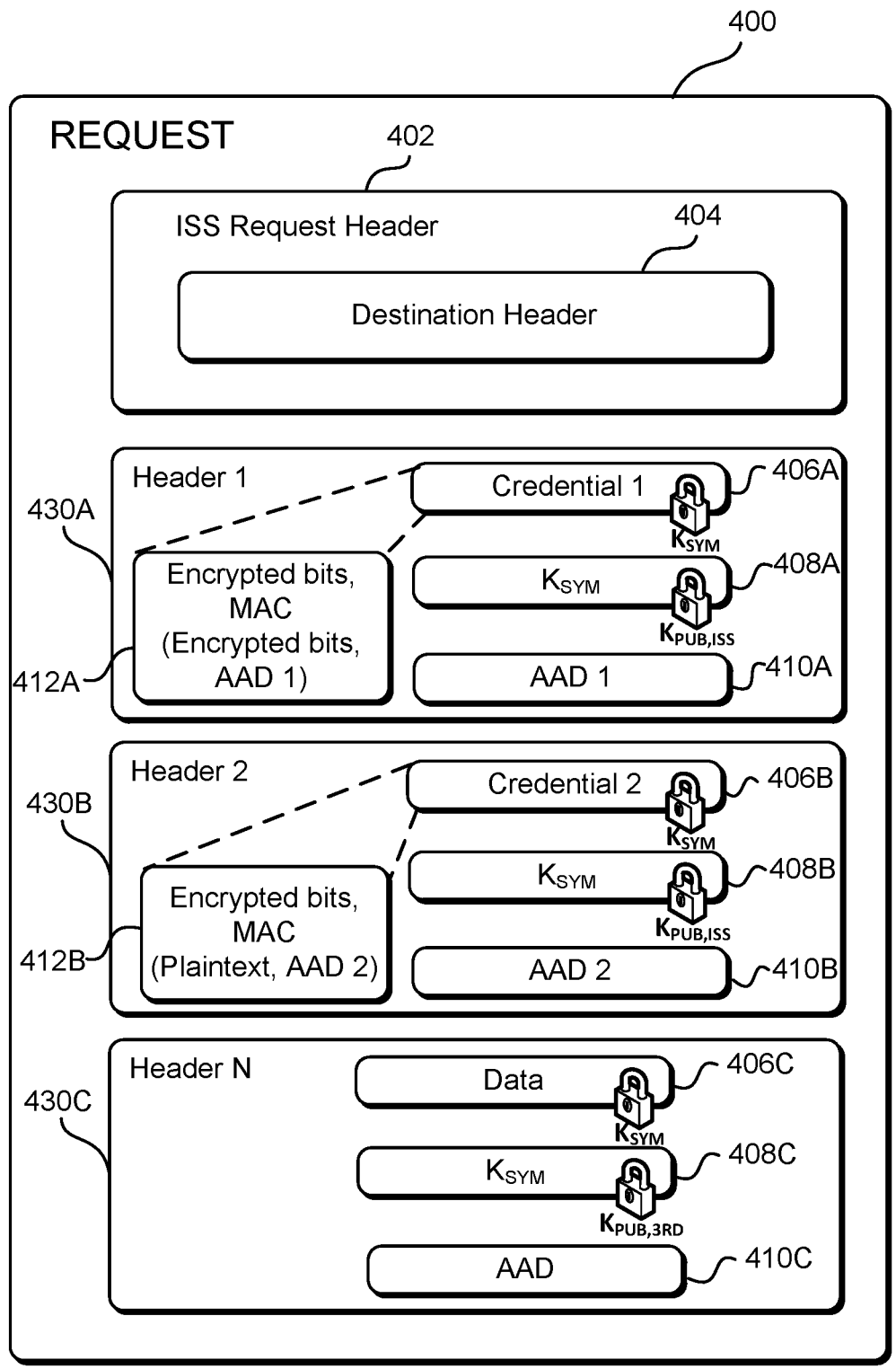
FIG. 4 illustrates an example request to access a resource of a third-party service in accordance with an embodiment.

FIG. 4 illustrates an example request 400 to access a resource of a third-party service in accordance with an embodiment. Request 400 may be request 304 discussed in connection with FIG. 3 above, or alternately may be request 304A of FIG. 3. In an embodiment, request 400 is created by a user device (such as user device 320, FIG. 3) in order to attempt to access a resource of a third-party service (for example, the second service provider 314 of FIG. 3). In an embodiment, request 400 may include a series of headers defining various types of data. In the example of FIG. 4, request 400 includes an ISS request header 402 which is associated with a destination header 404. ISS request header 402 may be a specific header created by the user device (320, FIG. 3) to contain and/or indicate the destination header 404. The destination header 404 indicates the network location that will be the final destination of request 400. In an alternate embodiment, ISS request header 402 may be created by the intermediate service (316, FIG. 3).

Request 400 may also contain a number of data headers, including, for example, header 1 430A, header 2 430B, and any appropriate number of other headers, represented in FIG. 4 as header N 430C. Some or all of the headers 430 A/B/C may contain encrypted data 406 A/B/C, symmetric key 408 A/B/C, and AAD 410 A/B/C. In an example, header 1 430A may indicate encrypted user credential 406A, encrypted symmetric key 408A, and the AAD 1 410A. Encrypted user credential 406A in turn includes encrypted bits of the user credentials and MAC 412A which was generated via encrypted bits of the user credentials and the AAD 1 410A. Header 2 430B may indicate user credential 406B, encrypted symmetric key 408B, AAD 2 410B. Encrypted user credential 406B in turn includes encrypted bits of the user credentials and MAC 412B which was generated via plaintext of the user credentials and the AAD 2 410B. Header N 430C may contain other credentials 406C, encrypted symmetric key 408C, and AAD 410C. In the example of FIG. 4, encrypted user credentials 406A, 406B and 406C are encrypted using the respective symmetric keys 408A, 408B, and 408C and AAD 1 410A, AAD 2 410B, and AAD 410C. In some embodiments, AADs 410A, 410B, and 410C each includes destination information of the service provider, including second service provider 214 of FIG. 2 or second service provider 114 of FIG. 1. In other embodiments, the request 400 may include the encrypted data 406 A/B/C, symmetric key 408 A/B/C, and AAD 410 A/B/C in the body of the request itself and not in separate headers 430 A/B/C.

In several embodiments, symmetric keys 408A and 408B are in turn encrypted by a public cryptographic key associated with the information security service (such as the ISS 318 of FIG. 3), while symmetric key 408C may be encrypted with a public cryptographic key associated with a third-party service (such as second service provider 314 of FIG. 3). In other words, various types of data may be contained by or indicated by request 400, some of which may be plaintext (unencrypted) and some of which may be encrypted using one or more cryptographic keys. In an embodiment, in addition to data headers, request 400 may also contain a body (not shown), and the body may contain encrypted data which may be decrypted by information security service 318.

In some embodiments, symmetric encrypted user credentials 406A and 406B may include encrypted bits and MACs 412A and 412B. MACs 412A and 412B are usable by the information security service 318 to authenticate data integrity of the headers 430A and 430B before, during, or after decryption. In one example, the generation of the MAC 412A can be based on the encrypted bits of credential 406A and AAD 410A, at which the authentication may occur before decryption. In another example, the generation of the MAC 412B can be based on the plaintext information of user credential 406B and AAD 410B, at which the authentication may occur after decryption.

Figure 5:
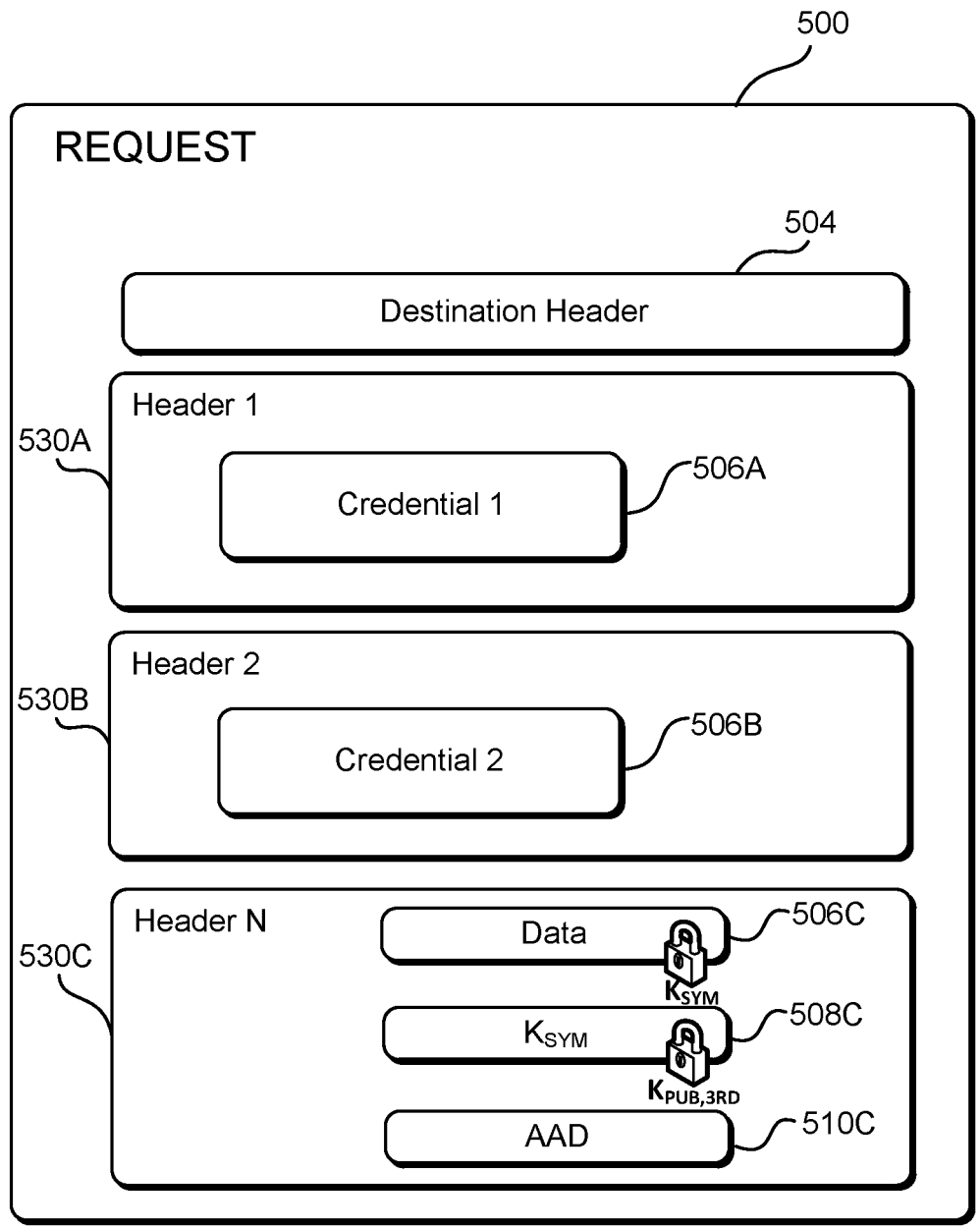
FIG. 5 illustrates an example request to access a resource of a third-party service after processing by an information security proxy service in accordance with an embodiment.

In an embodiment, request 400 of FIG. 4 is received by ISS (318, FIG. 3) and processed to create new request 500. Request 500 may be request 304B discussed in connection with FIG. 3 above. FIG. 5 illustrates an example request 500 to access a resource of a third-party service after processing by an information security service in accordance with an embodiment. After processing by ISS (318, FIG. 3), the ISS request header 402 of FIG. 4 has been stripped out of request 500, leaving destination header 504, which contains the destination address for request 500. Destination header 504 may be destination header 404 discussed above in connection with FIG. 4. ISS 318 has also generated credential 506A of header 530A and credential 506B of header 530B. Header 530A may be header 430A as discussed in connection with FIG. 4, and credential 506A may be the result of a decryption process performed on encrypted credential 406A of FIG. 4. Similarly, Header 530B may be header 430B as discussed in connection with FIG. 4, and credential 506B may be the result of a decryption process performed on encrypted credential 406B of FIG. 4. In both cases, the ISS (318, FIG. 3) may compare the information in destination header 504 with information from its corresponding AAD (not shown) to verify that the request 500 is being transmitted to the correct destination domain. In some embodiments, the ISS (318, FIG. 3) can decrypt after the destination domain is verified through the comparison between destination header 504 and the AADs in Headers 530A and 530C.

Additionally, header 530C may be header 430C of FIG. 4, symmetric key 508C may be symmetric key 408C of FIG. 4, AAD 510C may be AAD 410C of FIG. 4, and encrypted data 506C may be encrypted data 406C of FIG. 4. In other words, in the case of encrypted data 506C, the ISS 318 may have determined not to attempt to decrypt the encrypted data, as encrypted data 506C will be decrypted as appropriate by the destination third-party service. As previously described, ISS 318 may determine which headers 530A-530C to process based on information obtained from a configuration datastore (such as datastore 226, FIG. 2). Following processing by ISS 318, request 500 may be routed to a third-party service, such as second service provider 314, FIG. 3.

Figure 6:
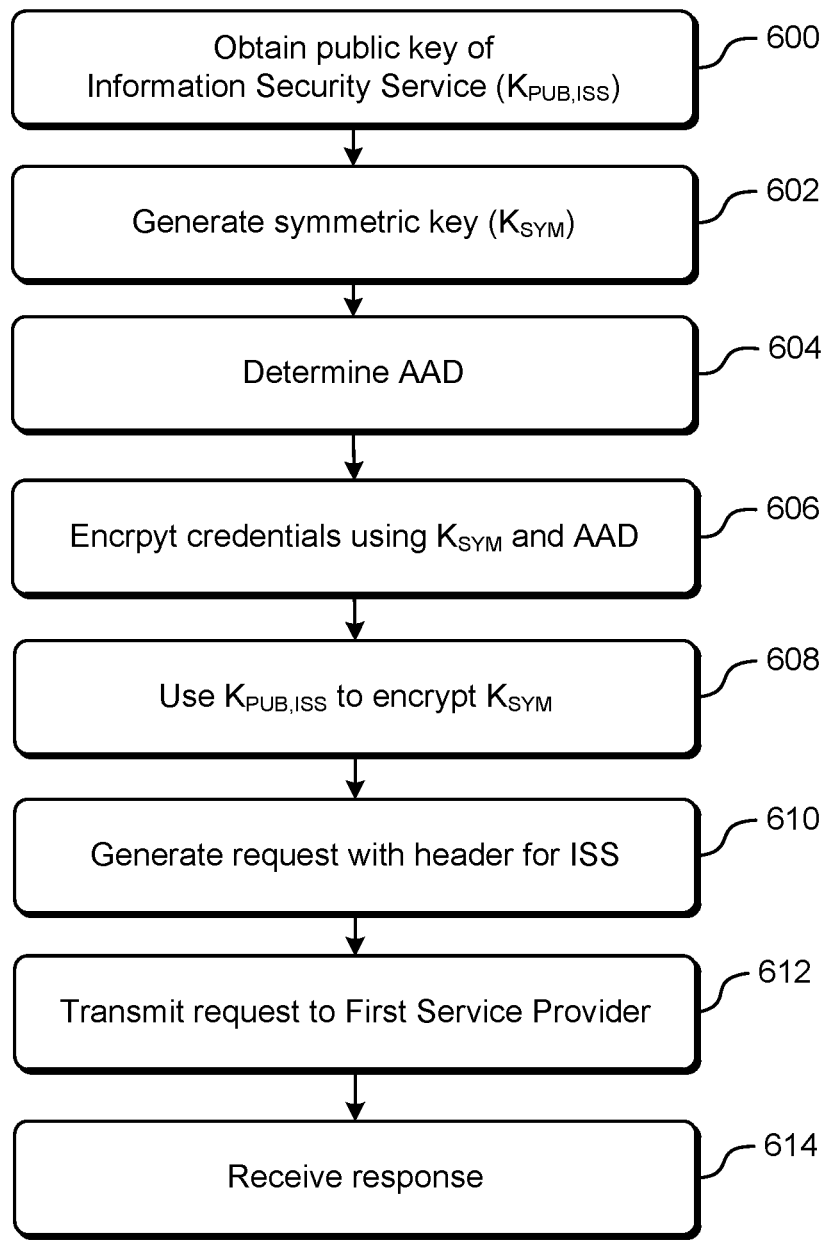
FIG. 6 illustrates an example flowchart for a user device in accordance with an embodiment.

FIG. 6 illustrates an example flowchart for a user device (such as user device 220, FIG. 2) in accordance with an embodiment. The process of FIG. 6 is performed in response to a trigger event such as a user request which requires interaction with a third-party service provider. For example, a user may make a spoken request to a personal assistant device to add a new event to their online calendar, where the calendar is provided by a third-party service. In another example, a user may use a graphical interface on a mobile device (e.g., a smart phone) to interact with an online shopping service. In both of these examples, interaction with a third-party service (e.g., the online calendar service, the online shopping service, etc.) may require a set of user credentials corresponding to an account tied to the third-party service. In order to ensure the security of the credentials as they are passed through the first service provider (e.g., a cloud computing service provider), the credentials can be encrypted as they pass through the first service provider and eventually decrypted before they arrive at the third-party service. In an embodiment, this encryption may be done using a public cryptographic key of an information security service, such as ISS 218 of FIG. 2. At step 600, user device 220 obtains a public key of ISS 218. The user device 220 may obtain the public key in various ways in accordance with various embodiments. For example, the user device 220 may make a call to a secure online service to retrieve the public key, query a hardware security module, obtain the public key from a digital certificate associated with the ISS 218, obtained from a trusted certificate authority and/or stored in local memory, or any other appropriate method of obtaining the public key.

At step 602, the user device 220 generates a symmetric key to encrypt the credentials to be submitted to the third-party service. Once the symmetric key is generated, the AAD 208 is determined (step 604). For example, the user device 220 may declare an AAD variable or struct then third-party service information is added (e.g., "cipher.updateAAD(byte[ ] src)"). The user device then encrypts a set of user credentials with the symmetric key and the AAD 208 (step 606). In one embodiment, the credentials may be encrypted using any suitable symmetric cryptographic algorithm such as the Galois counter mode of the Advanced Encryption Standard (AES-GCM). It should be noted that, while various embodiments of the present disclosure use AES-CTR and AES-GCM, other cryptographic ciphers may be used. Examples of include, for example, other modes of the Advanced Encryption Standard (AES), Blowfish, Data Encryption Standard (DES), Triple DES, Serpent or Twofish, and depending on the specific implementation selected, may be either asymmetric or symmetric key systems.

At step 608, the user device 220 uses the public key to encrypt the symmetric key used to encrypt the user credentials. In one example, the user device 220 encrypts the symmetric key using an asymmetric encryption algorithm, such as described below. The user device 220 generates a request to access a resource of a third-party provider, the request containing an ISS header which contains at least a destination address for the third-party provider in addition to the encrypted credentials 206 and the AAD 208 (step 610). In an embodiment, the user device generates the request to be an HTTP request or in accordance with another format, such as described above. In some embodiments, the encrypted credentials includes a MAC which is used by the ISS 218 to authenticate the integrity of the request being transmitted over the network. The user device 220 then transmits the request to the first service provider at step 612. This transmission may be done by any appropriate method. In an example embodiment, user device 220 transmits the request over a local wireless network to a wireless router, which then forwards the request over the Internet to the first service provider. Finally, the user device receives a response from the third-party service at step 614, typically returned through the first service provider.

In various embodiments, data objects such as credentials are made to be cryptographically verifiable. In one example, cryptographically verifiable data objects are created to be cryptographically verifiable by the system to which the data object is to be provided or another system that operates in conjunction with the system to which the data object is to be provided. For example, as noted above, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. In other examples, the encrypted credentials and the AAD can be used to generate a MAC or MAC can be generated based on the credentials and the destination information of the third-party service so as to allow the ISS to authenticate the request.

The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). Other variations, including variations where a symmetric key is shared between the two entities can be used to encrypt and/or digitally sign the data object.

As discussed, numerous variations utilize symmetric and/ or asymmetric cryptographic primitives, or a hybrid encryption mechanism incorporating features of both symmetric and asymmetric systems. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include algorithms that utilize hash-based message authentication codes (HMACs), other message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Figure 7:
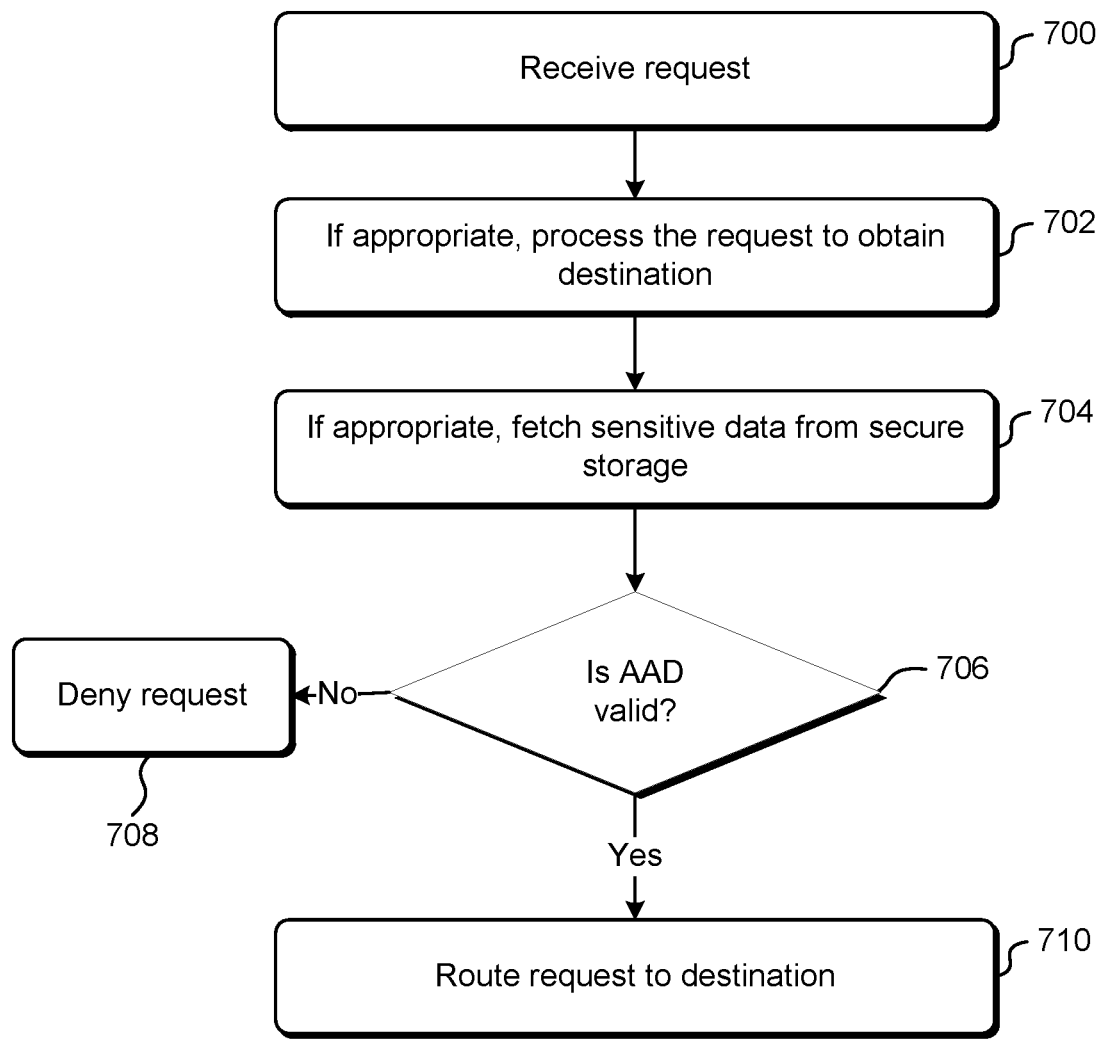
FIG. 7 illustrates an example flowchart for an intermediate service in accordance with an embodiment.

FIG. 7 illustrates an example flowchart for an intermediate service (such as intermediate service 216, FIG. 2) in accordance with an embodiment. At step 700, the intermediate service 216 receives the request (for example, request 204 as transmitted by user device 220, FIG. 2). Intermediate service 216 processes the request to determine the destination of the request (step 702). As previously described, this determination may be performed by processing a header contained in the request, accessing a look-up table in a datastore, or any other appropriate method of determining the destination. At step 704, the intermediate service 216 may determine that the request is to be routed to the ISS 218 and that sensitive data that has previously been encrypted (for example, by a separate encryption service of the first service provider) is not contained in the request, but instead must be fetched via an application programming interface (API) call from the secure storage location used by the encryption service. In this step, the request may contain a link to the secure storage location or instructions for fetching the sensitive data.

At step 706, the intermediate service 216 determines whether the AAD included in the request (e.g., request 204 of FIG. 2) is valid. In one implementation, the intermediate service 216 determines whether AAD is present in the request. In another implementation, the intermediate service 216 checks whether the AAD 208 contains all data fields as required by the ISS 218. As an example, the ISS 218 requires that AAD should include data fields such as endpoint and username. The intermediate service 216 processes the requirement and executes a keyword search of endpoint and username on the AAD 208. If it is determined that the AAD is not valid, the intermediate service 216 may deny the request from being transmitted to its listed destination (step 708). In addition to denying the request, the intermediate service 216 may perform one or more additional security actions. For example, one or more addition security actions may include generating an alert message or submitting a ticket to a ticketing system to notify the administrator of the intermediate service 216, which may indicate that suspicious activity has occurred and further investigation of the request denial is necessary. In another example, one or more additional security actions may also include generating an error message back to the IP address from which the request was first submitted or generating a message to the address associated with the user credentials that a request having such user credentials was submitted to the first service provider 210. The error message may include but are not limited to HTML status codes such as unauthorized status code 403 or forbidden status code 401. In another embodiment, the one or more additional security actions may include generating a log of the AADs of the denied requests. In some implementations, the one or more additional security actions may include sending information of the request denials (e.g., logs) to another service such as intrusion detection service, so as to enable the other service to perform actions to protect the first service provider 210 and/or the second service provider 214.

If it is determined that AAD is valid, the intermediate service 216 routes the request to the appropriate destination at step 710. The message may be sent directly to a third-party service or may be routed to the ISS 218 for processing.

Figure 8:
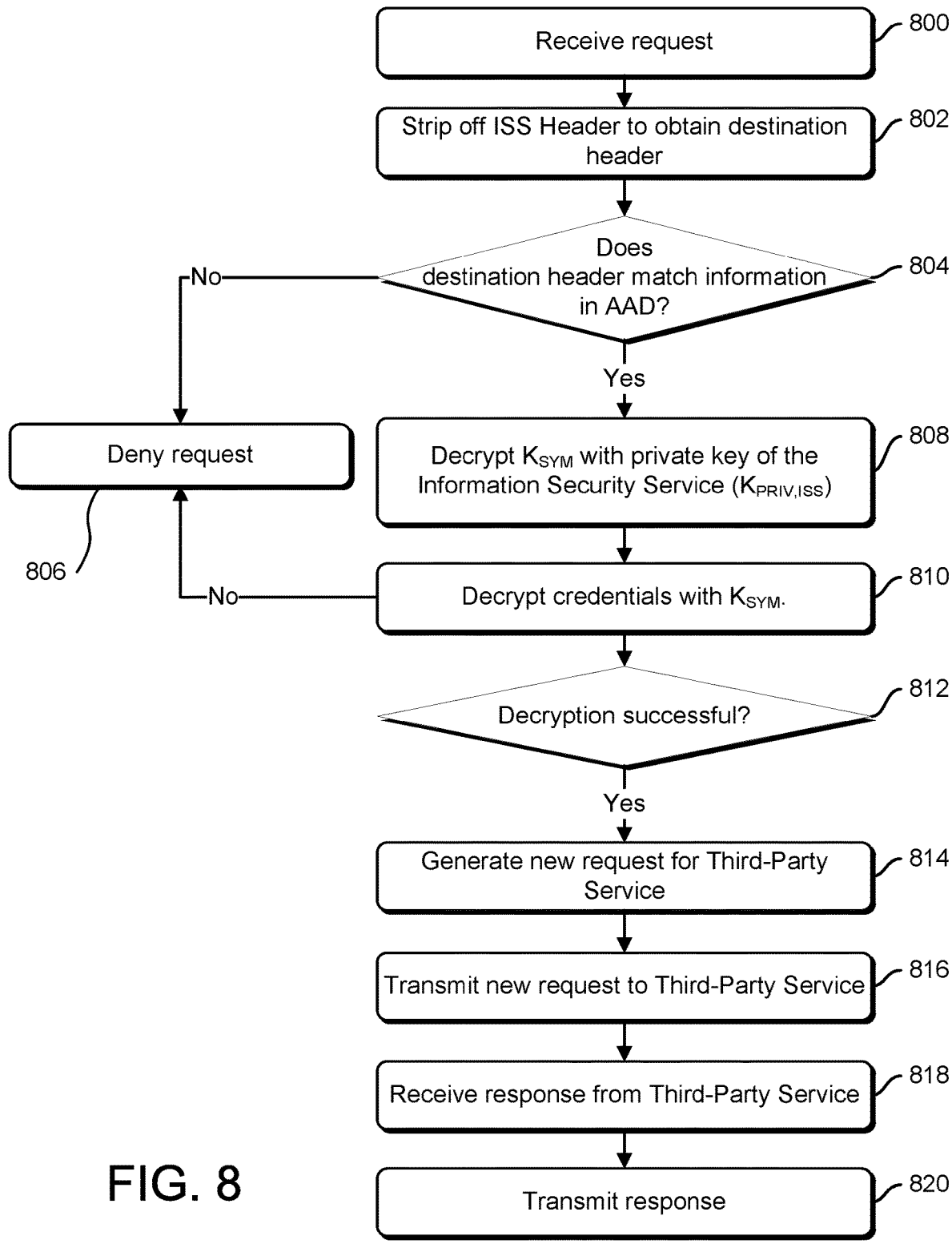
FIG. 8 illustrates an example flowchart for an information security service in accordance with an embodiment.

FIG. 8 illustrates an example flowchart for information security service (ISS) 218 in accordance with an embodiment. At step 800, ISS 218 receives a request (400, FIG. 4). The ISS 218 strips off the ISS request header to obtain the destination header (step 802). The ISS then determines whether the information contained in the destination header with the corresponding information embedded in AAD (step 804). If the information in the destination header does not match the information in AAD ("NO" branch from step 804), ISS 218 denies the request (step 806). Similar to the actions taken by intermediate service 216 in FIG. 7, the ISS 218 may perform one or more security actions in addition to denying the request, including but not limited to generating an alert message to the ISS administrator, adding the address of the destination header into a list of suspicious domains, issuing an error message back to the user device, and deleting the request.

If the information in the destination header matches the information in AAD ("YES" branch from step 804), the ISS 218 decrypts the encrypted symmetric key with private key of the ISS 218 (step 808). In some embodiments, the ISS 218 may obtain configuration information, as appropriate, from a datastore (226, FIG. 2) decrypt only the symmetric keys associated with the appropriate headers (i.e., determines which keys are encrypted with a public key associated with the ISS and decrypts those keys using its corresponding private key.) At step 810, the ISS 218 uses the decrypted symmetric key to decrypt the encrypted user credentials. After initiating the decryption process, the ISS 218 determines whether the decryption is successful (step 812). If the decryption is not successful ("NO" branch from step 804), ISS 218 denies the request (step 806). The decryption may be unsuccessful for various reasons, such as an invalid key, invalid ciphertext, invalid MAC input into the decryption algorithm, and/or invalid AAD. For instance, if the AAD was maliciously or inadvertently altered, a MAC generated during the decryption to check against the MAC input into the decryption algorithm may not be equal (or otherwise match). Note that, in an embodiment, even if decryption is still possible, the decryption algorithm may return an error (i.e., not return plaintext) if authenticity of the AAD is not successfully verified. In other words, in an embodiment, providing plaintext may be contingent on successful verification of the AAD. In addition, as previously described above, steps 804 and 812 may be occur in the opposite order or may be performed in parallel. For example, decryption of the encrypted credentials (step 812) can occur before the AAD is compared with the destination header (step 804). In another example, the comparison between the AAD and the destination header (step 804) can be performed by the ISS 218 while the decryption of the encrypted credentials (step 812) can be performed by a cryptoprocessor, another system (e.g., key management system, or a hardware security module ("HSM").

If decryption is successful ("YES" branch from step 812), the ISS 218 generates a new request (500, FIG. 5) containing the destination header and the decrypted data fields (step 814). The ISS 218 then routes new request 500 to a third-party service (such as second service provider 214, FIG. 2) at step 816. The third-party service receives the new request 500 and, if appropriate based on the decrypted user credentials, grants access to the service and completes the request, returning a response to the ISS 218. At step 818, the ISS 218 receives the response from the third-party service and encrypts that response, if appropriate, for routing back to the intermediate service 216 for eventual return to the user. Finally, at step 820, the ISS 218 transmits the response to the intermediate service 216, to be returned to the user device.

Figure 9:
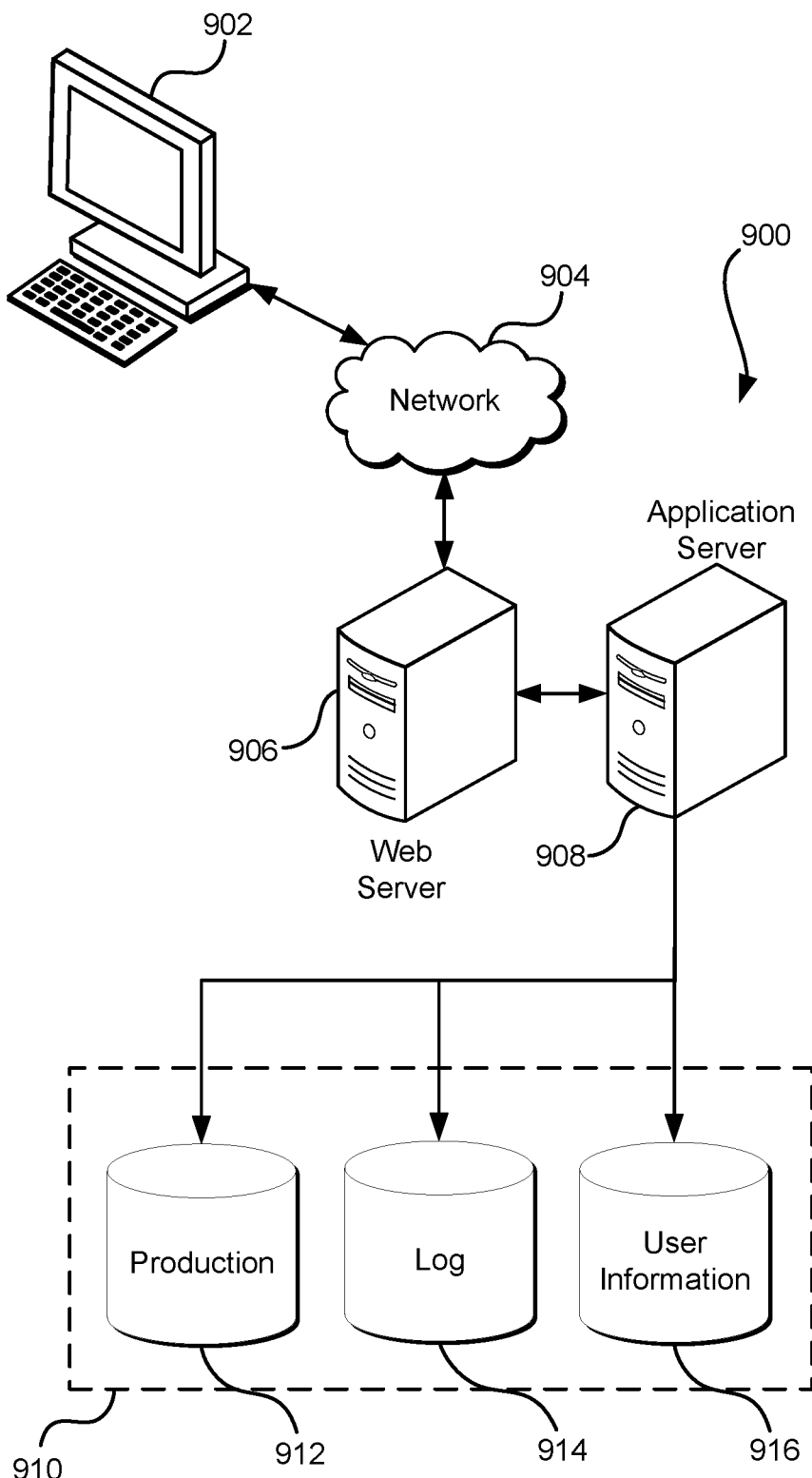
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network.

As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto and the application server 908 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially available operating systems and applications for purposes such as development and database management. In an embodiment, these devices also include other electronic devices, such as dummy terminals, thin-clients, gaming systems and other devices capable of communicating via a network, and virtual devices such as virtual machines, hypervisors, and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as My SQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The term "based on," unless otherwise stated or clear from context means "based at least in part on," and not "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
one or more processors;
memory that stores computer-executable instructions, that, if executed, cause the one or more processors to:
at a first service:
receive a first request comprising encrypted data, a message authentication code, and additional authenticated data that comprises a domain name of a third-party service provider, wherein the message authentication code is generated based on the additional authenticated data, a cryptographic key, and plaintext data of the encrypted data;

generate a second request by at least adding to the first request a destination header that indicates a destination of a third service at which the second request is to be transmitted;

receive a first response to the second request; and use the first response to provide a second response to the first request; and at a second service:

receive the second request;

validate whether the domain name of the additional authenticated data matches the destination of the second request;

as a result of determining that information associated with the encrypted data matches the destination header of the second request, transform the second request by at least replacing the encrypted data with the plaintext data, thereby resulting in a transformed second request;

transmit the transformed second request to the third service; and forward, to the first service, data from the third service in the first response.

2. The system of claim 1, wherein the encrypted data comprises encrypted credentials for accessing a resource of the third-party service provider.

3. The system of claim 1, wherein the message authentication code generated based at least in part on the plaintext of the encrypted data is generated based at least in part on the encrypted data.

4. The system of claim 1, wherein the additional authentication data further identifies a user that submitted the first request.

5. The system of claim 1, wherein the information associated with the encrypted data comprises the additional authentication data.

6. A computer-implemented method, comprising:

at a first service:

receiving a first request comprising encrypted data, a message authentication code, and additional authenticated data that comprises a domain name of a third-party service provider, wherein the message authentication code is generated based on the additional authenticated data, a cryptographic key, and plaintext data of the encrypted data;

generating a second request by at least adding to the first request a destination header that indicates a destination of a third service at which the second request is to be transmitted;

receiving a first response to the second request; and using the first response to provide a second response to the first request; and at a second service:

receiving the second request;

validating whether the domain name of the additional authenticated data matches the destination of the second request;

as a result of determining that information associated with the encrypted data matches the destination header of the second request, transforming the second request by at least replacing the encrypted data with the plaintext data, thereby resulting in a transformed second request;

transmitting the transformed second request to the third service; and forwarding, to the first service, data from the third service in the first response.

7. The computer-implemented method of claim 6, wherein the additional authenticated data identifies the third-party service provider.

8. The computer-implemented method of claim 7, wherein:

the encrypted data comprises first encrypted data encrypted with a first cryptographic key and second encrypted data encrypted with a second cryptographic key; and decrypting the encrypted data comprises decrypting only the first encrypted data.

9. The computer-implemented method of claim 7, wherein the additional authenticated data identifies a user that submitted the first request.

10. The computer-implemented method of claim 9, wherein the additional authenticated data is stored in plaintext format.

11. The computer-implemented method of claim 10, wherein validating whether the domain name of the additional authenticated data matches the destination of the second request further comprises:

extracting data from the destination header of the second request; and determining whether the extracted data matches the additional authenticated data.

12. The computer-implemented method of claim 6, wherein the cryptographic key is a symmetric cryptographic key.

13. One or more non-transitory computer-readable storage mediums having stored thereon executable instructions that, as a result of being executed by one or more processors, cause the one or more processors to at least:

at a first service:

receive a first request comprising encrypted data, a message authentication code, and additional authenticated data that comprises a domain name of a third-party service provider, wherein the message authentication code is generated based on the additional authenticated data, a cryptographic key, and plaintext data of the encrypted data;

generate a second request by at least adding to the first request a destination header that indicates a destination of a third service at which the second request is to be transmitted;

receive a first response to the second request; and use the first response to provide a second response to the first request; and at a second service:

receive the second request;

validate whether the domain name of the additional authenticated data matches the destination of the second request;

as a result of determining that information associated with the encrypted data matches the destination header of the second request, transform the second request by at least replacing the encrypted data with the plaintext data, thereby resulting in a transformed second request;

transmit the transformed second request to the third service; and forward, to the first service, data from the third service in the first response.

14. The one or more non-transitory computer-readable storage mediums of claim 13, wherein:

the encrypted data is encrypted by a symmetric cryptographic key; and the additional authenticated data identifies an address of the third service.

15. The one or more non-transitory computer-readable storage mediums of claim 14, wherein the symmetric cryptographic key is encrypted by a public cryptographic key provided by the first service.

16. The one or more non-transitory computer-readable storage mediums of claim 14, wherein the encrypted data comprises a set of user credentials for accessing the third service.

17. The one or more non-transitory computer-readable storage mediums of claim 16, wherein the first request comprises a cryptographic binding that is based at least in part on the plaintext data and the destination.

18. The one or more non-transitory computer-readable storage mediums of claim 17, wherein the instructions further comprise instructions that, as a result of being executed by the one or more processors, further cause the one or more processors to:

determine, based on the cryptographic binding, that address information of the destination header of the second request does not match the domain name in the additional authenticated data; and abort transmission of the second request to the third service.

19. The one or more non-transitory computer-readable storage mediums of claim 18, wherein the instructions further comprise instructions that, as a result of being executed by the one or more processors, further cause the one or more processors to perform one or more security actions in response to the transmission of the second request to the third service being aborted.

20. The one or more non-transitory computer-readable storage mediums of claim 14, wherein the instructions further comprise instructions that, as a result of being executed by the one or more processors, further cause the one or more processors to authenticate a user device that submitted the first request.

* * * * *